United States Patent Office.

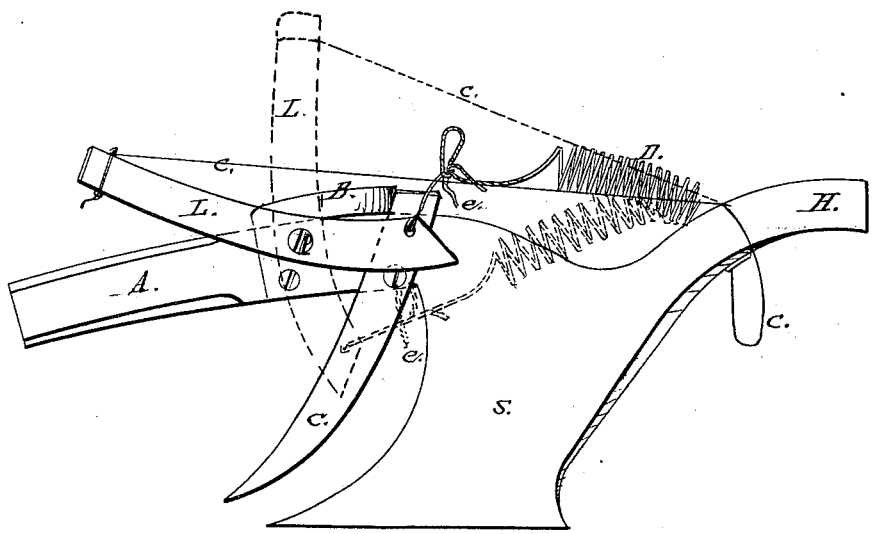

ANDREW C. BLACK, OF KAUKAUNA, WISCONSIN.

Letters Patent No. 90,488, dated May 25, 1869.

---

IMPROVEMENT IN PLOW-CLEARER.

---

The Schedule referred to in these Letters Patent and making part of the same.

---

*To all whom it may concern:*

Be it known that I, ANDREW C. BLACK, of Kaukauna, in the county of Outagamie, in the State of Wisconsin, have invented an Improved Plow-Clearer; and I do hereby declare the following to be a full and correct description of the same, reference being had to the accompanying drawing, which is a side elevation of a plow, with my improved clearer attached.

The invention consists in a plow-clearer, formed of a lever, pivoted to the plow-beam, in front of the coulter, and operated by a cord, counteracted by a spring, its range of movement being controlled by a stop, all as hereinafter set forth.

In the accompanying drawing—

A marks the plow-beam, to which the clearer L is pivoted, by the pin $p$.

To the upper end of the clearer is attached the cord $c$, which is carried back to the plow-handle H, so as to be under control of the person driving the plow.

A spiral, or other spring, D, attached to the plow-handle, or to any convenient part of the frame, is connected by cord $e$ with the lower end of the clearer L, and tends, by its reaction, to draw that end up into a horizontal position, as shown.

When grass, trash, or any obstructing matter accumulates in the angle between the beam A and coulter C, the driver of the plow jerks the cord $c$, until the lever L is drawn up into an upright position, as shown in red dotted lines in the figure, when the back of the clearer L comes into contact with the stop B, attached to the top of the beam, and the clearer is arrested in its backward movement.

This action throws the accumulated matter out on one side, and clears the plow.

The cord $c$ is then released, when the spring D restores the clearer to its original horizontal position.

Having thus fully described my invention,

What I claim, and desire to secure by Letters Patent, is—

The combination and arrangement of the lever L, cord $c$, spring D, cord $e$, and stop B, in the manner and for the purpose described.

The above specification of my said invention, signed and witnessed at Washington, this 24th day of April, A. D. 1869.

ANDREW C. BLACK.

Witnesses:
   CHAS. C. WILSON,
   CHAS. F. STANSBURY.